United States Patent [19]

Federmann et al.

[11] 4,380,443
[45] Apr. 19, 1983

[54] FIBER-REINFORCED DRIVE SHAFT

[75] Inventors: Helmut Federmann, Berg. Gladbach; Joachim Bausch, Dürscheid, both of Fed. Rep. of Germany

[73] Assignee: Felten & Guilleaume Carlswerk Aktiengesellschaft, Cologne, Fed. Rep. of Germany

[21] Appl. No.: 271,844

[22] Filed: Jun. 9, 1981

Related U.S. Application Data

[63] Continuation-in-part of Ser. No. 203,669, Nov. 3, 1980.

[30] Foreign Application Priority Data

Nov. 17, 1979 [DE] Fed. Rep. of Germany ....... 2946530
Jul. 19, 1980 [DE] Fed. Rep. of Germany ....... 3027432

[51] Int. Cl.³ .................................................. F16C 3/00
[52] U.S. Cl. ..................................... 464/181; 138/109; 464/183
[58] Field of Search ....................... 464/181, 182, 183; 138/109, 172, 174

[56] References Cited

U.S. PATENT DOCUMENTS

| 1,562,954 | 11/1925 | Goodall | 138/109 X |
| 4,185,472 | 1/1980 | Yates et al. | 464/181 |
| 4,236,386 | 12/1980 | Yates et al. | 464/181 |
| 4,238,539 | 12/1980 | Yates et al. | 464/183 X |
| 4,272,971 | 6/1981 | Loyd et al. | 464/183 X |

Primary Examiner—John Petrakes
Attorney, Agent, or Firm—Michael J. Striker

[57] ABSTRACT

A drive shaft, particularly for motor vehicles, has a tubular shaft part of a fiber reinforced synthetic plastic material, two end pieces each associated with respective one of the end portions of the shaft and having sleeve-shaped and ring-shaped sections, and a plurality of anchoring pins arranged on the end pieces on the region between the sleeve-shaped and the ring-shaped section at circumferentially spaced locations.

17 Claims, 4 Drawing Figures

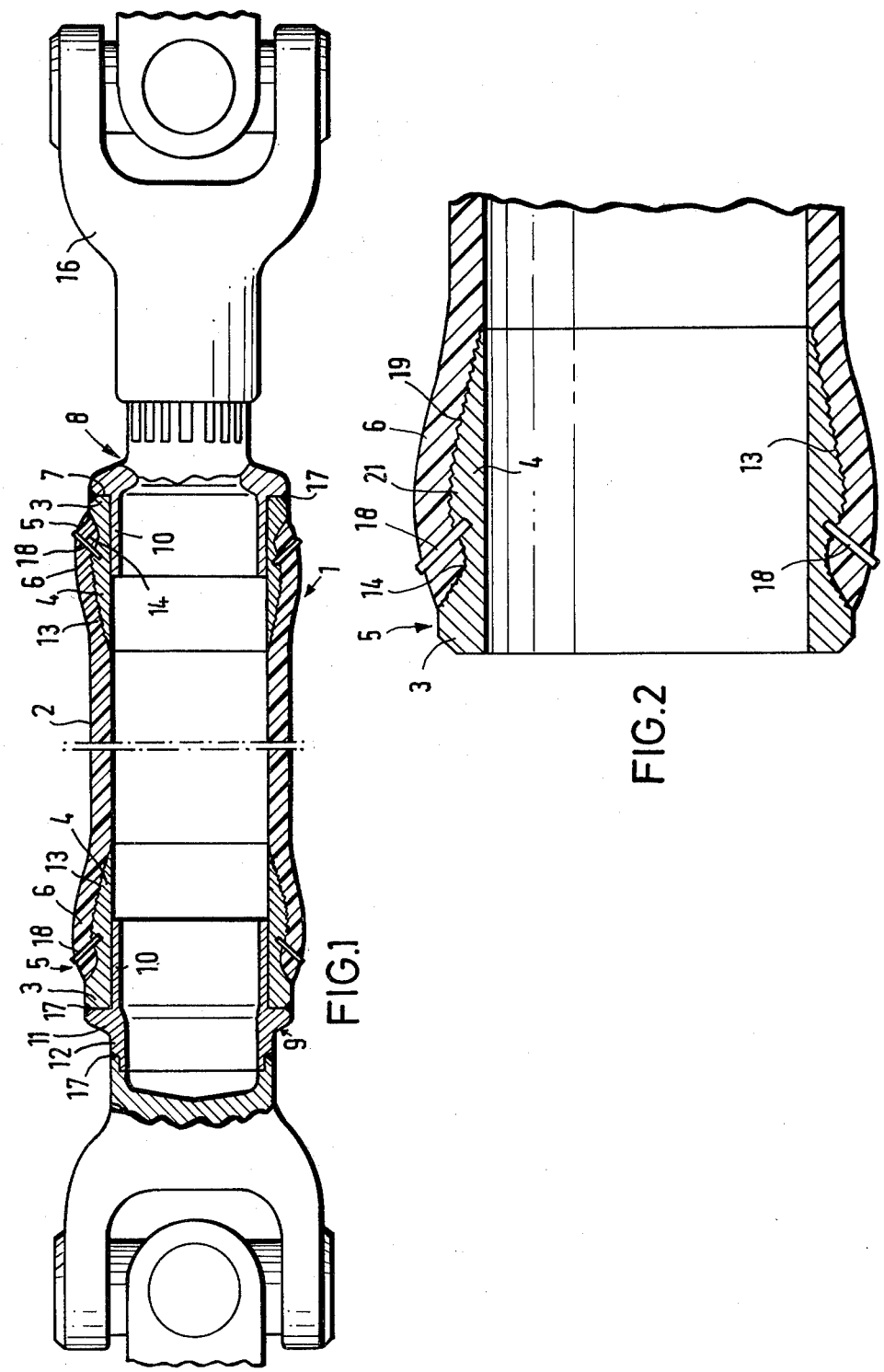

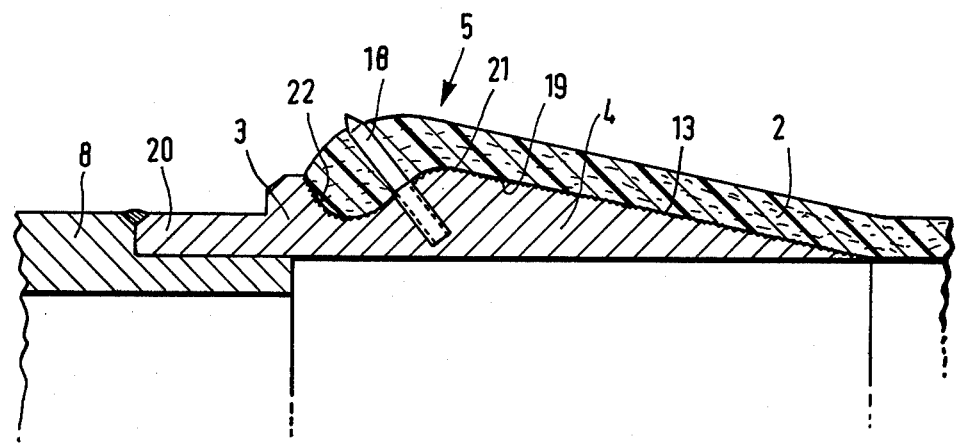
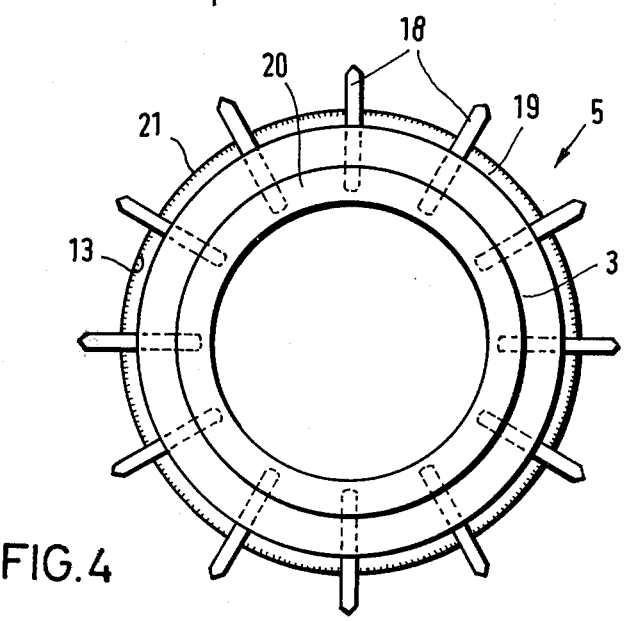

FIBER-REINFORCED DRIVE SHAFT

CROSS-REFERENCE TO A RELATED APPLICATION

This application is a continuation-in-part of application Ser. No. 203,669, filed on Nov. 3, 1980.

BACKGROUND OF THE INVENTION

The present invention relates to a fiber reinforced drive shaft, particularly a universal-joint shaft for motor vehicles, such as a Cardan shaft or the like.

Fiber reinforced drive shafts of the above-mentioned general type are known in the art. The German Offenlegungsschrift No. 2,851,292 describes, for example, the construction and method of manufacturing of a fiber reinforced Cardan shaft. It is provided with metallic end pieces each including a yoke part and an anchoring part of one piece with one another. For manufacturing the shaft, the end pieces are pulled onto the ends of a prefabricated tubular one-way mandrel, and after this in cooperation with the one-way mandrel located therebetween are enveloped with fiber reinforced synthetic plastic material. After hardening and vulcanization, the end pieces are thereby fixedly anchored, so that they form an unseparable unit with the thus-produced main part. Each of the yoke portions of the Cardan shafts can be assembled with the respective connecting yoke part with the aid of a transverse pin, so as to form a complete Cardan joint. The Cardan joint of the above-described construction is characterized by improved swinging condition as well as a smaller weight, as compared with conventional universal joints, particularly Cardan joints of steel.

Another drive shaft has a shaft part composed of a synthetic plastic matrix with embedded high strength fibers or fiber bundles which form a plurality of wound layers with windings of the inner and outer layers being helical and having a low pitch, but a pitch angle about 30°-60° of intermediate layers and with the windings of successive intermediate layers crossing one another. In this drive shaft, the projecting part of each end piece is formed as a ring section which is of one piece with a sleeve section having a greater outer diameter and an identical inner diameter, wherein the ring section has an inner end face bonded with the fibers or fiber bundles embedded in the synthetic plastic matrix. The end portions of the shaft part project from the fixedly connected end pieces, and the ring sections of the end pieces has end faces which form a stop and an end abutment for the end portions of the shaft part. Thereby, the thus formed end faces protect the shaft part against ambient influences.

It has been shown in practice that the above-described construction of the universal-joint shaft provides for excellent results. The sleeve section of each end piece has the identical inner diameter as their main section and extends into the interior of the shaft part with a reduced cross-section. The sleeve section is provided with an annular groove in the region of transition between the sleeve section and the ring section. When the end pieces are designed in the above-mentioned manner, there are certain difficulties in bringing of fibers or fiber bundles with a pitch angle between 30° and 60° and with the windings of successive layers crossing one another, onto the outer surface of the end pieces of metal to be connected therewith. During continuous winding of the shaft part, a reverse of the winding direction in the end regions of the shaft part is necessary when continuous fibers or fiber bundles must be wound. This is desirable for optimum strength of the ends of the connecting tubular parts and facilitation of the winding process. In this case, however, it is impossible to avoid the reverse loops of each fiber winding during the winding process, until an opposite displacement. The accidental position of the turning point of the fibers or fiber bundles can lead to an undesirable fiber structure at the ends of the shaft part which, in turn can undesirably affect optimum mechanical strength of the shaft in these regions.

SUMMARY OF THE INVENTION

Accordingly, it is an object of the present invention to provide a fiber reinforced drive shaft which avoids the disadvantages of the prior art.

More particularly, it is an object of the present invention to provide a drive shaft in which metallic end pieces are anchored and connected in optimum manner with end sections of a main shaft part with a predetermined fiber structure.

In keeping with these objects and with others which will become apparent hereinafter, one feature of the present invention resides, briefly stated, in a drive shaft in which means for connecting end pieces with a main shaft part includes a plurality of anchoring members provided in each of the end pieces, wherein the anchoring members are arranged on a sleeve-shaped section so that they extend substantially radially outwardly at a plurality of circumferentially spaced locations in the vicinity of a transition between the sleeve-shaped section and a ring-shaped section of each of the end pieces.

Since the anchoring members or pins are arranged on the region of transition between the sleeve-shaped section and the ring-shaped section of each end piece, torque resistant anchoring of the end piece in the end region of the main shaft part and the desired fiber structure in each end portion are absolutely reliably guaranteed. This is because each fiber bundle or rove is fixed during winding in end close turning point in a slide-free manner, before hardening of the synthetic plastic material and fixation of the fiber structure.

In accordance with another feature of the present invention, the anchoring members or pins are inclined relative to the end portions of the shaft part. Because of this inclination, each wound fiber bundle arrests tight on the outer surface of the end piece and provides for a narrow clamping of the same in each wound region of the shaft main part-end piece.

In accordance with still another feature of the present invention, the anchoring members or pins are introduced into the annular groove formed at the inner end or flank surface in the region of transition between the ring shaped section and the sleeve shaped section of each end piece. More particularly, the anchoring member is inserted into blind bores or screwed into threaded openings. Thereby, the position being determined for the turning points for fiber bundles or roves which are impregnated with synthetic plastic material, are formed.

It is advantageous to provide a great number of the anchoring members. When each end piece has an inner diameter between 60 and 80 mm, at least 24, advantageously 32, anchoring members are provided. This number of the anchoring members produces sufficient anchoring turning points in condition of adequate relative distance for passing of the fibers to be wound.

The profile of the sleeve-shaped section of the end piece, which includes a concave part increasing the wall thickness and an inclined part reducing the wall thickness of the sleeve-shaped section, provides for an especially effective force transmitting and engaging insertion of the sleeve-shaped section of each end piece into the respective end portion of the main shaft part.

A further advantage of the present invention resides in the fact that the end pieces are pulled onto a high accuracy steel mandrel and wound with a predetermined distance, wherein the diameter of the shaft is insignificantly increased because of its outer contour. Owing to the high accuracy steel mandrel, the shaft has narrow dimension tolerances. Thereby, the shafts have very small imbalance which is compensated by a cylindrical section of a smaller diameter, provided on the ring-shaped section of each end piece for mounting the shaft on a balancing arrangement or for receiving a weight compensating the imbalance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing a longitudinal section of a drive shaft in accordance with the present invention;

FIG. 2 is an enlarged view showing a longitudinal section of an end portion of the inventive shaft, without a connecting means;

FIG. 3 is a view which substantially corresponds to the view of FIG. 2 but shows another embodiment of the present invention; and FIG. 4 is an end view of a metallic end piece of the drive shaft shown in FIG. 3.

DESCRIPTION OF THE PREFERRED EMBODIMENTS

A drive shaft in accordance with the present invention is identified in toto by reference numeral 1 and has a tubular shaft part 2 and two metallic end pieces 5 anchored in end portions of the shaft part 2.

Each end piece 5 has a ring-shaped section 3 and a sleeve-shaped section 4 which is of one piece with the ring shaped section 3. The sleeve-shaped section 4 of each end piece 5 is firmly surrounded by the respective end portion 6 of the shaft part 2. The sleeve-shaped section 4 and the ring-shaped section 3 of each end piece 5 have identical inner diameters, but the outer diameter of the ring-shaped section 3 is greater than the outer diameter of the sleeve-shaped section 4. The ring-shaped section 3 of each end piece 5 extends axially outwardly beyond the end portion 6 of the shaft part 2.

An annular groove 14 is provided in each end piece 5 in the region of transition between the ring-shaped section 3 and the sleeve-shaped section 4 of the same. A plurality of anchoring pins 18 are arranged on each end piece 5 in the annular groove 14. The anchoring pins 18 are uniformly distributed in a circumferential direction of each end piece. They are inclined to the end of the shaft, or more particularly to the direction in which the end pieces 5 extend. The shaft part 2 is composed of a synthetic plastic matrix in which a plurality of fibers, fiber bundles, or roves are embedded. The fibers, fiber bundles or roves are impregnated with the hardenable synthetic plastic material. The thus arranged anchoring pins 18 serve for determination of turning points of the fibers, fiber bundles or roves which are wound for formation of the shaft part 2; they also serve after hardening of the synthetic plastic material for rotation resistant anchoring of the metallic end pieces 5 in the end portions of the shaft part 2 of the drive shaft 1.

The ring-shaped section 3 has a diameter which somewhat exceeds the diameter of the shaft part, and an outer end face 7. A connecting element 8, for example a yoke part 16 of a universal joint, is fixedly mounted on the end face 7 with the aid of a circumferential solder or weld seam 17. It is sometimes possible to provide between the connecting element 8 and the ring-shaped section 3, an adaptor element 9 with a centering portion 10, a transition portion 11, and a cylindrical portion 12, the adaptor element 9 to be welded to the end piece 5. Thereby, it is possible to provide different dimensions of the connecting element 8 or the respective drive shaft end.

The ring-shaped section 3 of each end piece 5 may also be provided with a cylindrical section 20 of a smaller diameter. The cylindrical portion 20 is arranged for compensation of imbalance or direct connection of additional part, for example, coupling part and the like. The anchoring pins 18 are uniformly distributed on the sleeve-shaped section 4 of each end piece 5, as considered in circumferential direction of the latter. They have an inner portion extending into the sleeve-shaped section 4, and an outer portion extending outwardly from the same. The anchoring pins 18 can be inserted into blind holes provided in a wall bounding the annular groove 14. On the other hand, a plurality of threaded openings may be provided in which the anchoring pins 18 are screwed. When each end piece 5 has an inner diameter of between 60 and 80 mm, at least 24, advantageously 32 anchoring pins 18 are provided.

As can be seen from FIGS. 2 and 3, the sleeve section 4 of each end piece 5 has an annular convex part 21 which increases the wall thickness of the sleeve-shaped section and has an outer diameter substantially corresponding to the diameter of the ring-shaped section 3. Each sleeve-shaped section 4 has also an inclined part 19 which reduces the wall thickness of the sleeve-shaped section to a zero value in direction towards the interior of the shaft. The above-mentioned parts of each sleeve-shaped section 4 are connected with one another. The entire outer surface of the sleeve-shaped section 4, including the convex part 21 and the inclined part 19, is provided with a plurality of projections or knurling 13. At least a portion of the ring-shaped section 3, particularly an inner end or flank face 22, is also provided with such knurling.

Since each end piece 5 is designed as disclosed hereinabove, the torque is transmitted without tension peaks continuously from the fiber reinforced synthetic plastic shaft part 2 to the metallic end pieces 5. The knurling 13 of the outer surface increases the sliding resistance of the fiber bundles or roves during positioning of the same, and makes stronger the clamping between the metallic end pieces 5 and the fiber reinforced synthetic plastic shaft part 2. The thus designed drive shaft 1 is especially advantageous when it is utilized as a drive shaft, particularly a universal-joint shaft, in vehicles, in the sense of its manufacturing and mechanical strength and operational safety.

It will be understood that each of the elements described above, or two or more together, may also find a useful application in other types of constructions differing from the types described above.

While the invention has been illustrated and described as embodied in a drive shaft for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention:

What is claimed as new and desired to be protected by Letters Patent is set forth in the appended claims.

1. A drive shaft, particularly for motor vehicles, comprising a tubular shaft part having an axis and two axially spaced end portions and being composed of a fiber-reinforced synthetic plastic material; two end pieces each associated with a respective one of said end portions of said shaft and having a sleeve-shaped section extending into and surrounded by a respective one of said end portions of said shaft part, and a ring-shaped section extending axially outwardly from said sleeve-shaped section and having an inner end face which forms a stop and a protective end abutment for a respective one of said end portions of said shaft part, said end pieces being constituted of metal; and means for connecting said end pieces with said shaft part, said connecting means including a plurality of anchoring members provided in each of said end pieces, said anchoring members being arranged on said sleeve-shaped section so that they extend substantially radially outwardly at a plurality of circumferentially spaced locations in the vicinity of a transition between said sleeve-shaped section and said ring-shaped section of each of said end pieces.

2. A drive shaft as defined in claim 1, wherein said sleeve-shaped section of each of said end pieces has a predetermined inner and outer diameters, said ring-shaped section of each of said end pieces having an outer diameter which exceeds the outer diameter of said sleeve-shaped section and an inner diameter which is equal to the inner diameter of said sleeve-shaped section of the same end piece.

3. A drive shaft as defined in claim 1, wherein said end portions of said shaft part are composed of a synthetic plastic matrix with embedded fibers bonded with said inner end face of a respective one of said end pieces.

4. A drive shaft as defined in claim 1, wherein said end portions of said shaft part are composed of a synthetic plastic matrix with embedded fiber bundles bonded with said inner end face of a respective one of said end pieces.

5. A drive shaft as defined in claim 1, wherein said ring-shaped sections of said end pieces have a predetermined outer diameter, said shaft part has a central portion located between said end portions and having an outer diameter which is substantially equal to the outer diameter of said ring-shaped sections of said end pieces.

6. A drive shaft as defined in claim 1, wherein said anchoring members are uniformly distributed on said sleeve-shaped section of each of said end pieces, as considered in a circumferential direction of the latter.

7. A drive shaft as defined in claim 1, wherein each of said anchoring members is formed as an anchoring pin having an inner portion inserted into said sleeve-shaped section of a respective one of said end pieces and an outer portion extending substantially radially outwardly from the same.

8. A drive shaft as defined in claim 1, wherein each of said end pieces extending in a predetermined direction, said anchoring members being inclined to said direction of extension of a respective one of said end pieces.

9. A drive shaft as defined in claim 1, wherein each of said end pieces has an annular groove provided in the region of transistion between said sleeve-shaped section and said ring-shaped section, said anchoring members being introduced into said annular groove of a respective one of said end pieces.

10. A drive shaft as defined in claim 9, wherein each of said end pieces has a plurality of blind holes provided in a wall bounding said annular groove, said anchoring members being inserted into said blind holes.

11. A drive shaft as defined in claim 9, wherein each of said end pieces has a plurality of threaded openings provided in a wall bounding said annular groove, said anchoring members being screwed into said threaded openings.

12. A drive shaft as defined in claim 1, wherein each of said end pieces has an inner diameter of between 60 mm and 80 mm and is provided with at least 24 of said anchoring members.

13. A drive shaft as defined in claim 12, wherein each of said end pieces is provided with 32 of said anchoring members.

14. A drive shaft as defined in claim 1, wherein said sleeve-shaped section of each of said end pieces has an outer contour including a convex part radially increasing the wall thickness of said sleeve-shaped section, and an adjoining inclined part radially decreasing the wall thickness of said sleeve-shaped section to 0-value.

15. A drive shaft as defined in claim 14, wherein said ring-shaped section of each of said end pieces has a predetermined outer diameter, said convex part of said sleeve-shaped section of each of said end pieces having an outer diameter substantially corresponding to the outer diameter of said ring-shaped section of the same end pieces.

16. A drive shaft as defined in claim 14, wherein said sleeve-shaped section of each of said end pieces has an outer surface entirely provided with a plurality of projections.

17. A drive shaft as defined in claim 16, wherein at least a part of said ring-shaped section of each of said end pieces has an outer surface at least partially provided with a plurality of projections.

* * * * *